United States Patent [19]

Greebe

[11] Patent Number: 4,800,921
[45] Date of Patent: Jan. 31, 1989

[54] METHOD AND APPARATUS FOR DIVIDING A SINGLE STREAM OF LIQUID AND VAPOR INTO MULTIPLE STREAMS HAVING SIMILAR VAPOR TO LIQUID RATIONS

[75] Inventor: Frans Greebe, Calgary, Canada

[73] Assignee: Exxon Production Research Company, Houston, Tex.

[21] Appl. No.: 876,961

[22] Filed: Jun. 20, 1986

[51] Int. Cl.$^4$ .................... F16K 51/00; E21B 43/24
[52] U.S. Cl. .................... 137/561 A; 166/303
[58] Field of Search ............... 137/561 R, 561 A, 154; 166/303, 272

[56] References Cited

U.S. PATENT DOCUMENTS

| | | | |
|---|---|---|---|
| 3,175,578 | 3/1965 | Patterson et al. | 137/561 A |
| 3,349,803 | 10/1967 | Bourgeois | 138/37 |
| 3,395,730 | 8/1968 | Mennesson | 137/561 |
| 3,633,344 | 1/1972 | Erlangen | 55/349 |
| 3,795,259 | 3/1974 | Brandin et al. | 137/561 |
| 3,899,000 | 8/1975 | Ohlswager et al. | 137/561 |
| 4,085,776 | 4/1978 | Derrick | 137/561 |
| 4,140,178 | 2/1979 | Ohlswager et al. | 165/161 |
| 4,396,063 | 8/1983 | Godbey | 166/250 |
| 4,512,368 | 4/1985 | Kaminaka et al. | 137/561 |
| 4,522,218 | 6/1985 | Konak | 137/3 |
| 4,528,919 | 7/1985 | Harbolt et al. | 111/7 |
| 4,536,104 | 8/1985 | Büngert | 406/183 |
| 4,574,827 | 3/1986 | Konak | 137/89 |
| 4,574,837 | 3/1986 | Aggour et al. | 137/561 A |

FOREIGN PATENT DOCUMENTS

| 3032984 | of 1980 | Fed. Rep. of Germany | 138/37 |
|---|---|---|---|
| 3106822 | 10/1982 | Fed. Rep. of Germany | 137/561 A |

OTHER PUBLICATIONS

Fouda, A. E. and Rhodes, E., "Two-Phase Annular Flow Stream Division", 1972, pp. 353–363, Inst. of Chemical Engineers, vol. 50.

Fouda, A. E. and Rhodes, E., "Two-Phase Annular Flow Stream Division in a Simple Tee", 1974, pp. 354–360, Inst. of Chemical Engineers, vol. 52.

Hong, K. C., "Two-Phase Flow Splitting at a Pipe Tee", 1978, Society of Petroleum Engineers of AIME.

Rehman, M., "A Wet Steam Manifold for a Heavy Oil Project", Petroleum Society of CIM.

Henry, J. A. R., "Dividing Annular Flow in a Horizontal Tee," 1981, pp. 343–355, International Journal of Multiphase Flow, vol. 7.

Azzopardi, B. J. and Whalley, P. B., "The Effect of Flow Patterns on Two-Phase Flow in a T Junction," 1982, pp. 491–507, Int. J. Multiphase Flow, vol. 8, No. 5.

WTI Engineers & Contractors, Ltd. Sales Brochure Entitled, WTI "Magic Ball" Steam Aplitter/Mark I-Manifold Unit, Approx. 1985.

Primary Examiner—John Rivell
Attorney, Agent, or Firm—Mark A. Smith

[57] ABSTRACT

The present invention utilizes a gravity influenced liquid distribution within a substantially horizontal header which receives a liquid-vapor mixture in annular flow from a supply line and divides that single stream into multiple streams, each flowing through a branchline to deliver substantially uniform quality liquid-vapor mixture to a nearby site. The header is substantially horizontal and each branchline is connected to the periphery of the header further downstream and relatively lower on the periphery of the header than the preceding branchline.

18 Claims, 2 Drawing Sheets

METHOD AND APPARATUS FOR DIVIDING A SINGLE STREAM OF LIQUID AND VAPOR INTO MULTIPLE STREAMS HAVING SIMILAR VAPOR TO LIQUID RATIONS

BACKGROUND OF THE INVENTION

This invention relates to a method and apparatus for dividing a mixture of vapor and liquid from a first stream carried in a supply line into multiple streams conducted in respective branchlines, each of the multiple streams having a similar ratio of vapor to liquid. More particularly, the present invention employs a substantially horizontal header which receives a first stream from a supply line and divides it into a plurality of streams having similar vapor-liquid ratios.

Many operations and processes require a supply of vapor and liquid mixture available for use at a plurality of adjacent sites. Often, the vapor and liquid mixture is most conveniently prepared at a central facility, initially conducted through a single supply line and delivered to each adjacent site through a separate branchline. Some applications require control of the vapor-liquid ratio in the branchline to ensure the uniformity of the vapor and liquid mixtures delivered at each of the sites.

One such application is the thermal recovery of oil in which it would be convenient to generate steam at a central facility, conduct the steam to the field in a single or common supply line, divide the supply line into multiple branchlines at a header, and supply wet steam to one well within the field with each branchline.

The difficulty in this distribution is that without special provisions, the vapor and liquid components of the steam will not divide with uniform vapor-liquid ratios entering each of the branchlines. The disparity in this ratio or steam quality is a serious concern in oil recovery applications because similar steam quality throughout the field is desirable for reservoir management purposes.

SUMMARY OF THE PRESENT INVENTION

The present invention utilizes a gravity influenced liquid distribution in an annular flow regime within a substantially horizontal header which receives a liquid-vapor mixture from a supply line and divides that single stream into multiple streams, each flowing through a branchline to a nearby site. The header is substantially horizontal and each branchline is connected to the periphery of the header further downstream and relatively lower on the periphery of the header than the preceding branchline.

BRIEF DESCRIPTION OF THE DRAWINGS

The above description, as well as further objects, features and advantages of the present invention will be more fully appreciated by reference to the following detailed description of the presently preferred embodiment when taken in conjunction with the accompanying drawings in which.

DESCRIPTION OF THE PREFERRED EMBODIMENT

Figures 1, 2, 3, 4, 5, 6:
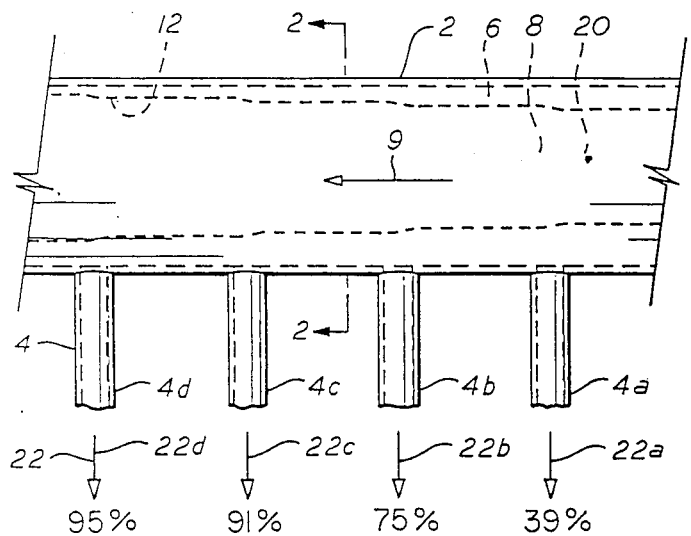
FIG. 1 is a side elevational view of a horizontal piping arrangement constructed in accordance with the prior art.
FIG. 2 is a cross sectional view of a header and annular ring taken along line 2—2 of FIG. 1.
FIG. 3 is a perspective view of a piping arrangement constructed in accordance with the present invention.
FIG. 4 is a cross sectional view of the header of FIG. 3 taken along line 4—4 of FIG. 3.
FIG. 5 is a cross sectional view of the header of FIG. 3 taken along line 5—5 of FIG. 3.
FIG. 6 is a cross sectional view of the header of FIG. 3 taken along line 6—6 of FIG. 3.

FIG. 1 illustrates the prior art of a piping arrangement which fails to address the distribution problems solved by the present invention. In this case, a horizontal header 2 receives a first stream 20 of a mixture of liquid such as water 6 and vapor such as steam 8 from generating facilities and a supply line which are not illustrated. First stream 20 is divided in horizontal header 2 into a plurality of streams 22 each carried in a branchline 4. In the illustration of the prior art in FIG. 1, four branchlines 4a, 4b, 4c and 4d are illustrated to conduct streams 22a, 22b, 22c and 22d, respectively. In one experiment, placing each of branchlines 4 at the lowermost periphery of header 2 was found to provide steam qualities of 39%, 75%, 91% and 95% from branchlines 4a, 4b, 4c and 4d, respectively. Such widely varying vapor-liquid ratios are unacceptable for thermal oil recovery and other distributed industrial processes, yet prior approaches to solve this problem have proven complicated, expensive, and cumbersome.

FIG. 2 is a cross-section taken at line 2—2 of FIG. 1 which illustrates a typical gravity influenced annular flow distribution of first stream 20 flowing through header 2. Annular flow is characterized by the collection of the liquid component of a mixed stream on the periphery of the conducting member while the vapor component flows along the center of the conducting member. Thus, liquid component 6 of first stream 20 tends to collect in an annular ring 12 flowing through the header, while vapor component 8 of first stream 20 flows through the center of annular ring 12. The thickness of annular ring 12 increases toward the lower regions of horizontal header 2 under the influence of gravity. This thickness has been designated "a" in FIG. 2.

It has further been found through field results that the distribution of annular ring 12 within header 2 re-establishes itself rather quickly after it is disturbed by the junction of a branchline 4 which draws a mixture of the liquid and vapor components of stream 20 into a side stream 22.

Thus, as the liquid component 6 of the first stream is removed by branchlines 4, the absolute thickness of annular ring 12 is reduced along the axial downstream direction of the header, but the relative film thickness distribution of the annular ring around the periphery of the header is maintained. The present invention makes use of this behavior and distribution of liquid and vapor components within a horizontal header and the fact that the amount of liquid drawn off at a branchline is a function of the local thickness of the liquid film in the annular ring.

Referring now to FIG. 3, the reference numeral 10 refers generally to a piping arrangement of the present invention in which a substantially horizontal header 2 has a plurality of branchlines 14a-e, each connected in fluid communication with header 2 at a position axially downstream and lower on periphery 16 of header 2 than the preceding branchline, and a trailing branchline 14f connected at a position axially downstream from, and no lower on the periphery of the header than, the last preceding branchline. Arrow 11 illustrates the direction of flow of the vapor-liquid mixture through header 2. In the illustrated embodiment of the invention, header 2 is circular in cross section. In some embodiments the downstream end of header 2 will be closed, in other applications the supply line will continue from the downstream end of the header.

FIGS. 4, 5 and 6 show cross-sections of piping arrangement 10. FIG. 4 illustrates an upstream branch line 14a which is located high on periphery 16 of header 2 where liquid film 30 forming annular ring 12 will be at a relatively thin point in cross-section. The thickness of annular ring 12 at branchline 14a has been designated with the reference character "A".

FIG. 5 illustrates a cross-section taken along line 5—5 in FIG. 3 which bisects branchline 14c. Branchline 14c is downstream from branchline 14a and is located lower on the periphery 16 of header 2 than was the junction 28 of header 14a. Annular ring 12 is thinner throughout this cross-section than it was at any corresponding point at the cross section of 14a because a portion of liquid component 6 was drawn off through branchlines 14a and 14b before reaching branchline 14c. However, the juncture of 14c is at a relatively thicker portion of the cross-section of annular ring 12, compensating for the reduced liquid component 6 and thereby maintaining the thickness of the annular ring at the respective branchlines at a substantially constant thickness "A".

FIG. 6 is another cross-section of header 2 further downstream than the cross-section of FIG. 5. This cross-section is taken through branchline 14d which is located relatively lower than was branchline 14c. Similarly, branchline 14d is placed so that annular ring 12, though thinner throughout this cross-section, is at a relatively thicker position of the cross-section of branchline 14e and has the substantially same thickness "A" as did the cross-section of FIGS. 4 and 5. This relationship also holds true at the cross-sections through branchlines 14b and 14e which have not been illustrated here.

FIG. 3 illustrates a full distribution of six branchlines 14, radially disposed from header 2 at angles of +90° upright, 45°, 0° horizontal, −45°, 90° downward, and −90° downward, respectively as proceeding axially downstream on the header. This is only illustrative and other distributions may be employed depending upon the properties of the material which is to be distributed, its flow rate, the desired number of branchlines, the sizes of the header and branchlines, and other factors which determine an effective configuration for a particular application. A person of ordinary skill in the art who is provided with this disclosure can easily establish an acceptable configuration for a particular application.

Further, it is noted that the last or trailing branchlines, as indicated by reference numeral 14f in FIG. 3, are less sensitive to location than are the upstream branchlines when placed low on the periphery of the header. The location of the last branchline is also less sensitive when the end of the header is closed. Refer again to FIG. 1 which relates data taken from a closed end header. In one example, the distribution of wet steam at a flow rate in the supply line conducive to annular ring formation can be fed into a four-inch header having 5 three-inch branch lines which promote steam quality control sufficiently uniform to be acceptable for thermal oil recovery applications with a configuration placing branchlines at +45°, 0° horizontal, −45°, −90°, and −90°, respectively.

Referring again to FIGS. 3–6, applying the apparatus of the present invention also provides a method of dividing a single or common stream 20 of a liquid and vapor mixture into a multiple branch stream 22 having substantially uniform vapor-liquid quality. A single stream 20 is conducted into substantially horizontal header 2 where liquid component 6 forms an annular ring 12 having film thickness "a". A first branch stream 22a is drawn from the single stream 20 at a juncture 28 for branchline 14a. The film thickness at this juncture has a specific thickness "A" and all subsequent branch streams 14 are then drawn at a juncture 28 positioned such that film thickness "a" of the annular ring at the juncture has a thickness substantially equal to "A".

The flow reduction towards the end of a header in an embodiment having a great number of branchlines may be sufficient to cause annular flow to change to stratified wavy or slug flow unless the diameter of the header is stepped down. The calculation of size and location of these diameter reductions necessary to maintain flow in the annular regime is straightforward and well known to those skilled in the art.

The present invention provides a simple, inexpensive and convenient method and apparatus for distributing vapor-liquid streams from a single stream in a common supply line among a plurality of branchlines in a manner such that each branchline receives a stream of similar vapor to liquid ratio.

Thermal oil recovery is particularly well suited to the apparatus and method of the present invention in which wet steam is generated at a central facility, conducted to the field in a common supply line and distributed at a substantially horizontal header through branchlines to oil wells for injection downhole.

Figure 7:
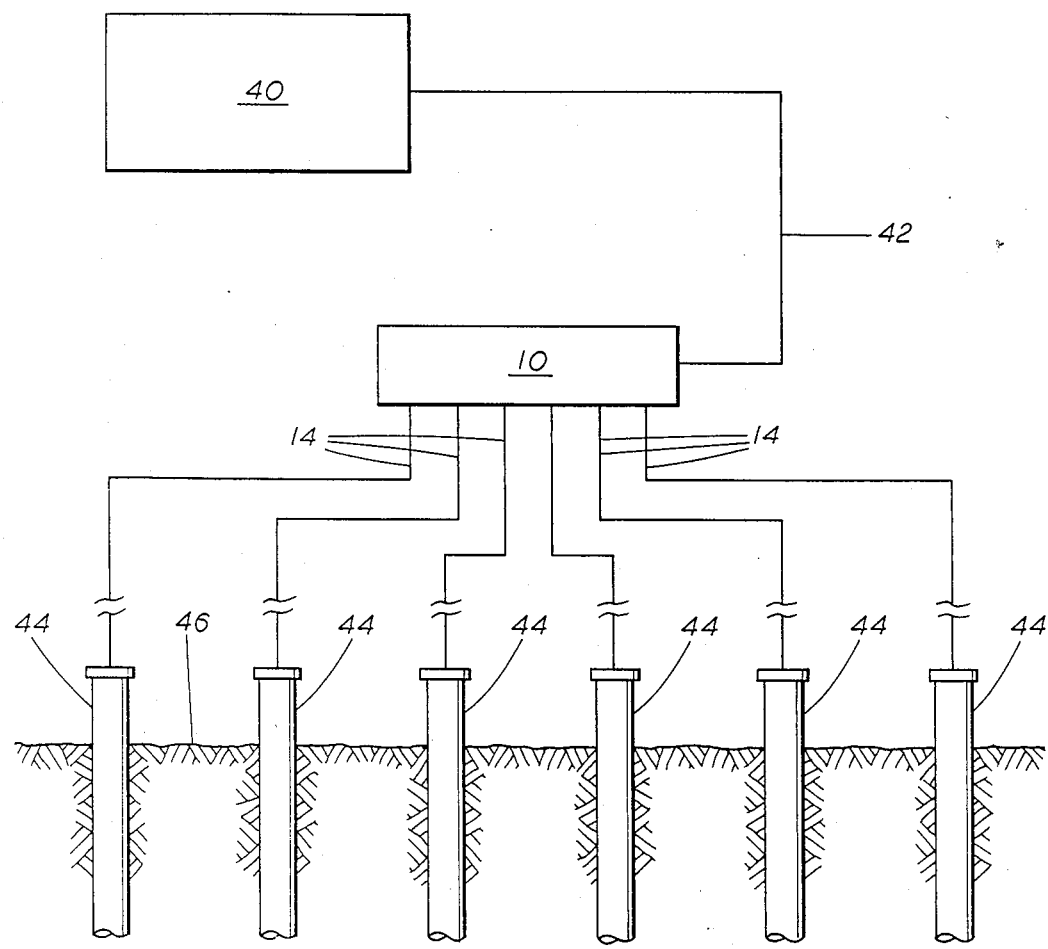
FIG. 7 is a diagrammatic view of a control steam generator and piping arrangement of the present invention for equal splitting of vapor and liquid into multiple branchlines leading to a plurality of separate oil wells.

FIG. 7 illustrates in block diagram form an embodiment of the present invention which is adapted to the thermal recovery of oil. With reference to FIG. 7, it will be seen that steam is generated at a central control steam facility or generator 40 and conducted through a common supply line 42 to a piping arrangement 10 in accordance with the present invention. From piping arrangement 10, stream is distributed to a plurality of branchlines 14 via a substantially horizontal header in the manner previously described. Each branchline receives a stream of wet stream having a similar vapor to liquid ratio. Branchlines 14 are connected to a plurality of oil wells 44. Each oil well 44 receives wet steam through a branchline 14. The wet steam is injected downhole at oil wells 44 into oil-containing reservoir 46, in accordance with thermal oil recovery techniques known to those skilled in the art.

Other modifications, changes and substitutions are intended in the foregoing disclosure and in some instances, some features of the invention will be employed without a corresponding use of other features. Accordingly, it is appropriate that the apending claims be construed broadly and in a manner consistent with the spirit and scope of the invention herein.

I claim:

1. A piping arrangement to promote equal splitting of vapor and liquid into multiple branchlines comprising:
   a substantially horizontal header for receiving a stream of vapor and liquid in which the liquid component of the stream collects on the interior of the header in an annular ring, the annular ring having a thickness which varies along the header as a function of both the elevation on the periphery of the header and the quantity of the liquid component remaining in the stream;

a first branchline in fluid conducting communication with the header for drawing a first branch stream of vapor and liquid from the header, the first branchline being connected relatively high on the periphery of the header; and a second branchline in fluid conducting communication with the header for drawing a second branch stream of vapor and liquid from the header, the second branchline being connected downstream of the first branchline and relatively lower on the periphery of the header, so that the vapor-liquid quality of the second branch stream is substantially equal to the vapor-liquid quality of the first branch stream.

2. A piping arrangement constructed in accordance with claim 1 further comprising additional branchlines in fluid communication with the header for drawing additional branch streams of vapor and liquid from the header, each additional branchline being connected axially downstream and relatively lower on the periphery of the header than preceding branchlines, so that the vapor-liquid quality of the branch streams is substantially uniform.

3. A piping arrangement constructed in accordance with claim 1 wherein the header is cylindrical.

4. A piping arrangement constructed in accordance with claim 1 wherein the vapor is steam and the liquid is water.

5. A piping arrangement constructed in accordance with claim 4 wherein the piping arrangement is employed to aid the thermal recovery of oil, further comprising:

a supply line conducting the steam and water to the header; and a well connected to each branchline.

6. A piping arrangement to promote equal splitting of vapor and liquid components of wet steam into multiple branchlines comprising:

a substantially horizontal, cylindrical header for receiving a stream of wet steam in which the liquid component of the wet steam collects on the interior of the header in an annular ring, the annular ring having a thickness which varies along the header as a function of both the elevation on the periphery of the header and the quantity of the liquid component remaining in the stream;

a first branchline in fluid conducting communication with the header for drawing a first branch stream of wet steam from the header, the first branchline being connected relatively high on the periphery of the header; and a plurality of additional branchlines in fluid conducting communication with the header for drawing additional branch streams of wet steam from the header, each additional branch stream being connected axially downstream and relatively lower on the periphery of the header than the preceding branchlines, so that the vapor-liquid quality of the first branch stream and the additional branch streams is substantially uniform.

7. A piping arrangement constructed in accordance with claim 6 wherein five branchlines are connected to the periphery of the header in the following relation with respect to an axial horizontal orientation of 0°:

the first branchline is connected substantially at 90°;

the second branchline is connected substantially at +45°;

the third branchline is connected substantially at 0°;

the fourth branchline is connected substantially at −45°; and the fifth branchline is connected substantially at −90°.

8. A piping arrangement constructed in accordance with claim 6 further comprising a trailing branchline in fluid conducting communiction with the header, connected axially downstream from the plurality of additional branchlines and no lower on the periphery of the header than the last preceeding branchline.

9. A piping arrangement constructed in accordance with claim 8 wherein five branchlines are connected to the periphery of the header in the following relation with respect to an axial horizontal orientation of 0°:

the first branchline is connected substantially at +45°;

the second branchline is connected substantially at +0°;

the third branchline is connected substantially at −45°;

the fourth branchline is connected substantially at −90°; and the fifth branchline is connected substantially at −90°.

10. A piping arrangement constructed in accordance with claim 9 wherein the header has a four-inch diameter and the branchlines have three-inch diameters.

11. A piping arrangement for splitting a single stream of vapor and liquid into multiple streams comprising:

a header for receiving the single stream of vapor and liquid in which the liquid component of the single stream collects on the interior periphery of the header in an annular ring of varying thickness "a", the header being oriented such that the thickness "a" of the annular ring varies along the header as a function of both the elevation on the periphery of the header and the quantity of the liquid component remaining in the single stream; and a plurality of branchlines disposed axially along the header, each disposed to draw a mixture of liquid and vapor from the header at positions where the film thickness "a" of the annular ring is substantially the same.

12. A piping arrangement constructed in accordance with claim 11 wherein the header is substantially horizontal.

13. A piping arrangement constructed in accordance with claim 12 wherein the vapor is steam and the liquid is water.

14. A substantially horizontal header assembly for splitting a single stream of liquid and vapor into multiple streams having similar ratios of liquid and vapor, the header assembly comprising:

a header having an interior periphery configured to collect the liquid component of the single stream in an annular ring flowing axially through the header, the annular ring having a thickness "a" which varies along the header as a function of both the elevation on the periphery of the header and the quantity of the liquid component remaining in the single stream;

a plurality of branchlines for receiving the multiple streams; and a plurality of junctions, each connecting one of the branchlines in fluid communication with the header, and each junction positioned along the periphery of the header to intercept the annular ring formed by the liquid component of the first stream at substantially equivalent film thicknesses "a".

15. A header assembly constructed in accordance with claim 14 where the header is cylindrical.

16. A header assembly constructed in accordance with claim 14 wherein the vapor is steam and the liquid is water.

17. A steam distribution system distributing wet steam throughout an oil field for use in the thermal recovery of oil comprising:

a central steam generating facility;

a common supply line receiving wet steam from the central steam generating facility;

a substantially horizontal header receiving wet steam from the supply line in which the liquid component of the wet steam collects on the periphery of the header in an annular ring of varying film thickness "a", the annular ring having a thickness which varies along the header as a function of both the elevation on the periphery of the header and the quantity of the liquid component remaining in the wet steam;

a plurality of branchlines disposed axially along the header, each disposed to a stream of the wet steam at positions where the film thickness "a" of the annular ring is substantially the same; and a plurality of oil wells, each receiving wet steam of substantially equivalent steam quality from one of the branchlines.

18. A method for dividing a single stream of liquid and vapor into multiple branch streams having substantially uniform quality mixtures of liquid and vapor, said method comprising the following steps:

conducting the single stream into a substantially horizontal header such that the liquid component of the stream forms an annular ring on the interior periphery of the header having a thickness "a" which varies as a function of both the elevation on the periphery of the header and the quantity of liquid component remaining in the flow through the header;

dividing a first branch stream from a single stream into a branchline through a first junction in fluid communication with the header, said first junction positioned to receive vapor and liquid from the header at a position relatively high on the periphery of the header where the annular ring formed by the liquid component has a specific thickness "a" which is designated "A"; and dividing subsequent branch streams from the single stream of the header at a plurality of subsequent junctures in fluid communication with the header, each juncture being further axially downstream than the preceding and each positioned sufficiently lower on the periphery of the header relative to the last preceding branchline to receive vapor and liquid from the header where the annular ring formed by liquid component has substantially the thickness "A".

* * * * *